United States Patent
Casati et al.

(10) Patent No.: US 12,219,463 B2
(45) Date of Patent: Feb. 4, 2025

(54) ENFORCEMENT OF MAXIMUM NUMBER OF ADMITTED TERMINALS PER NETWORK SLICE

(71) Applicant: Nokia Technologies Oy, Espoo (FI)

(72) Inventors: Alessio Casati, Surrey (GB); Bruno Landais, Pleumeur-Bodou (FR)

(73) Assignee: NOKIA TECHNOLOGIES OY, Espoo (FI)

(*) Notice: Subject to any disclaimer, the term of this patent is extended or adjusted under 35 U.S.C. 154(b) by 440 days.

(21) Appl. No.: 17/765,273

(22) PCT Filed: Sep. 30, 2019

(86) PCT No.: PCT/EP2019/076476
§ 371 (c)(1),
(2) Date: Mar. 30, 2022

(87) PCT Pub. No.: WO2021/063483
PCT Pub. Date: Apr. 8, 2021

(65) Prior Publication Data
US 2022/0394596 A1  Dec. 8, 2022

(51) Int. Cl.
*H04W 48/06*  (2009.01)
(52) U.S. Cl.
CPC .................................. *H04W 48/06* (2013.01)
(58) Field of Classification Search
CPC ... H04B 7/0695; H04L 5/0023; H04L 5/0048; H04L 5/0051; H04L 5/0094; H04W 24/08; H04W 36/00; H04W 72/02; H04W 72/046
See application file for complete search history.

(56) References Cited

U.S. PATENT DOCUMENTS

| | | |
|---|---|---|
| 2017/0303259 A1 | 10/2017 | Lee et al. |
| 2017/0339609 A1 | 11/2017 | Youn et al. |
| 2017/0367110 A1 | 12/2017 | Li et al. |
| 2019/0029065 A1 | 1/2019 | Park et al. |

(Continued)

FOREIGN PATENT DOCUMENTS

| | | |
|---|---|---|
| EP | 3481109 A1 | 5/2019 |
| EP | 3512272 A1 | 7/2019 |

(Continued)

OTHER PUBLICATIONS

"5G; System Architecture for the 5G System", 3GPP TS 23.501 v15.4.0 Release 15, (Mar. 2019), 235 pages.

(Continued)

*Primary Examiner* — Nizam U Ahmed
(74) *Attorney, Agent, or Firm* — Robert P. Michal, Esq.; Carter, DeLuca & Farrell LLP

(57) ABSTRACT

There are provided measures for enforcement of maximum number of admitted terminals per network slice. Such measures exemplarily comprise receiving a packet data connection related request concerning a network slice being configured with a maximum number of terminals to be admitted to said network slice, maintaining a counter indicative of a number of terminals admitted to said network slice based on said packet data connection related request, and transmitting a response to said packet data connection related request.

4 Claims, 16 Drawing Sheets

(56) References Cited

U.S. PATENT DOCUMENTS

| | | | |
|---|---|---|---|
| 2019/0223093 A1* | 7/2019 | Watfa | H04W 36/13 |
| 2020/0367109 A1 | 11/2020 | Chen et al. | |
| 2022/0256439 A1 | 8/2022 | Casati et al. | |
| 2022/0377655 A1* | 11/2022 | Keller | H04W 60/00 |

FOREIGN PATENT DOCUMENTS

| | | |
|---|---|---|
| WO | WO 2018/232241 A1 | 12/2018 |
| WO | WO 2019/030429 A1 | 2/2019 |
| WO | WO 2019/032968 A1 | 2/2019 |
| WO | WO 2019/074347 A1 | 4/2019 |
| WO | WO 2019/105095 A1 | 6/2019 |

OTHER PUBLICATIONS

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15)", 3GPP TS 29.274 v15.9.0, (Sep. 2019), 396 pages.

"3rd Generation Partnership Project; Technical Specification Group Core Network and Terminals; 5G System; Network Function Repository Services; Stage 3 (Release 15)", 3GPP TS 29.510 v15.5.0, (Sep. 2019), 128 pages.

"3rd Generation Partnership Project; Technical Specification Group Core Network and Terminals; Mobile radio interface Layer 3 specification; Core network protocols; Stage 3 (Release 15)", 3GPP TS 24.008 v15.7.0, (Sep. 2019), 792 pages.

"3rd Generation Partnership Project; Technical Specification Group Services and System Aspects; Procedures for the 5G System (5GS); Stage 2 (Release 15)", 3GPP TS 23.502 v15.15.0, (Sep. 2021), 365 pages.

"End-to-End Network Slicing", White Paper 3, Outlook 21, Wireless World Research Forum, (Nov. 2017), 40 pages.

Bega et al., "Optimising 5G Infrastructure Markets: The Business of Network Slicing", IEEE INFOCOM 2017—IEEE Conference on Computer Communications, (May 1-4, 2017), 9 pages.

Habibi et al., "The Structure of Service Level Agreement of Slice-Based 5G Network", arXiv:1608.10426v1, (Jun. 27, 2018), 6 pages.

International Search Report and Written Opinion for Patent Cooperation Treaty Application No. PCT/EP2019/076476 dated Sep. 11, 2020, 20 pages.

MediaTek Inc., "Clarification on PLMN's Maximum Number of PDU Sessions", 3GPP TSG-CT WG1 Meeting #112bis, C1-186479, (Oct. 15-19, 2018), 3 pages.

* cited by examiner

ENFORCEMENT OF MAXIMUM NUMBER OF ADMITTED TERMINALS PER NETWORK SLICE

CROSS-REFERENCE TO RELATED APPLICATIONS

This application is a national phase entry of International Application No. PCT/EP2019/076476 filed Sep. 30, 2019, the entire contents of which are incorporated herein by reference.

FIELD

The present invention relates to enforcement of maximum number of admitted terminals per network slice. More specifically, the present invention exemplarily relates to measures (including methods, apparatuses and computer program products) for realizing enforcement of maximum number of admitted terminals per network slice.

BACKGROUND

The present specification generally relates to network slicing and in particular to enforcement of service level agreement criteria such as a maximum number of user equipments (UE) (as an example for terminals) to be admitted to a network slice.

Network slicing is a prominent feature of the 5G system. The Global System for Mobile Communications Association (GSMA) is working on simplifying the way network slices are defined. To do so, the GSMA has created a generic slice template (GST) document. This GST document includes a list of attributes that describe the network slice.

Such description may result in the definition of network slice types that e.g. meet certain service level agreement (SLA) criteria.

One such SLA criterion is for instance the maximum number of UEs (terminals) that are admitted to a network slice.

The SLA criterion "maximum number of UEs (terminals) that are admitted to a network slice" is specified in the GST document as follows:

The attribute "Number of terminals" describes the maximum number of terminals supported by the network slice.

| Parameters | |
|---|---|
| Value | Integer |
| Measurement unit | NA |
| Example | 100.000 terminals |
| | 10.000.000 terminals (sensors) |
| Tags | Scalability attribute |

As additional information on the specification of the SLA criterion "maximum number of UEs (terminals) that are admitted to a network slice" it is stated that this is an important input to scale the network slice and to provide enough resources to the network slice. In particular, it is noted that it is a significant difference if the network slice is used to serve 10 users or 1.000.000 users.

While there is a demand for the enforcement of SLA criteria and in particular of the SLA criterion "maximum number of UEs (terminals) that are admitted to a network slice", the 3$^{rd}$ Generation Partnership Project (3GPP) specifications do not provide for such enforcement. In particular, it is thus according to the 3GPP specifications not possible to enforce this limit "maximum number of UEs (terminals) that are admitted to a network slice".

Hence, there is a need to provide for (measures for) enforcement of maximum number of admitted terminals per network slice.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving a packet data connection related request concerning a network slice being configured with a maximum number of terminals to be admitted to said network slice, maintaining a counter indicative of a number of terminals admitted to said network slice based on said packet data connection related request, and transmitting a response to said packet data connection related request.

According to an exemplary aspect of the present invention, there is provided a method comprising transmitting a session management policy association establishment request, concerning a network slice being configured with a maximum number of terminals to be admitted to said network slice, in response to a packet data unit session establishment request issued by a communication endpoint, wherein said session management policy association establishment request comprises at least single network slice selection assistance information identifying said network slice, receiving a session management policy association establishment response indicative of acceptance or rejection of a session management policy association establishment according to said session management policy association establishment request, and transmitting a packet data connection related response indicative of acceptance or rejection of packet data connection establishment according to said packet data unit session establishment request.

According to an exemplary aspect of the present invention, there is provided a method comprising receiving a packet data connection related response including an indication that exceedance of a maximum number of terminals to be admitted to a network slice is a reason for rejection of a packet data connection establishment, and handling said network slice as a not allowed network slice.

According to an exemplary aspect of the present invention, there is provided a method comprising receiving, in relation to a packet data connection establishment, a 5G system user equipment configuration update message indicative of that a network slice is a not allowed network slice, and preventing consideration of said network slice.

According to an exemplary aspect of the present invention, there is provided an apparatus comprising receiving circuitry configured to receive a packet data connection related request concerning a network slice being configured with a maximum number of terminals to be admitted to said network slice, maintaining circuitry configured to maintain a counter indicative of a number of terminals admitted to said network slice based on said packet data connection related request, and transmitting circuitry configured to transmit a response to said packet data connection related request.

According to an exemplary aspect of the present invention, there is provided an apparatus comprising transmitting circuitry configured to transmit a session management policy association establishment request, concerning a network slice being configured with a maximum number of terminals to be admitted to said network slice, in response to a packet data unit session establishment request issued by a communication endpoint, wherein said session management policy association establishment request comprises at least single network slice selection assistance information identifying said network slice, receiving circuitry configured to receive a session management policy association establishment response indicative of acceptance or rejection of a session management policy association establishment according to said session management policy association establishment request, and transmitting circuitry configured to transmit a packet data connection related response indicative of acceptance or rejection of packet data connection establishment according to said packet data unit session establishment request.

According to an exemplary aspect of the present invention, there is provided an apparatus comprising receiving circuitry configured to receive a packet data connection related response including an indication that exceedance of a maximum number of terminals to be admitted to a network slice is a reason for rejection of a packet data connection establishment, and handling circuitry configured to handle said network slice as a not allowed network slice.

According to an exemplary aspect of the present invention, there is provided an apparatus comprising receiving circuitry configured to receive, in relation to a packet data connection establishment, a 5G system user equipment configuration update message indicative of that a network slice is a not allowed network slice, and preventing circuitry configured to prevent consideration of said network slice.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform receiving a packet data connection related request concerning a network slice being configured with a maximum number of terminals to be admitted to said network slice, maintaining a counter indicative of a number of terminals admitted to said network slice based on said packet data connection related request, and transmitting a response to said packet data connection related request.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform transmitting a session management policy association establishment request, concerning a network slice being configured with a maximum number of terminals to be admitted to said network slice, in response to a packet data unit session establishment request issued by a communication endpoint, wherein said session management policy association establishment request comprises at least single network slice selection assistance information identifying said network slice, receiving a session management policy association establishment response indicative of acceptance or rejection of a session management policy association establishment according to said session management policy association establishment request, and transmitting a packet data connection related response indicative of acceptance or rejection of packet data connection establishment according to said packet data unit session establishment request.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform receiving a packet data connection related response including an indication that exceedance of a maximum number of terminals to be admitted to a network slice is a reason for rejection of a session management policy association establishment, and tagging said network slice as a not allowed network slice.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform receiving, in relation to a packet data connection establishment, a 5G system user equipment configuration update message indicative of that a network slice is a not allowed network slice, and preventing consideration of said network slice.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient establishment control in relation to network slices considering the SLA criterion "maximum number of UEs (terminals) that are admitted to a network slice" to thereby solve at least part of the problems and drawbacks identified in relation to the prior art.

By way of exemplary embodiments of the present invention, there is provided enforcement of maximum number of admitted terminals per network slice. More specifically, by way of exemplary embodiments of the present invention, there are provided measures and mechanisms for realizing enforcement of maximum number of admitted terminals per network slice.

Thus, improvement is achieved by methods, apparatuses and computer program products enabling/realizing enforcement of maximum number of admitted terminals per network slice.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
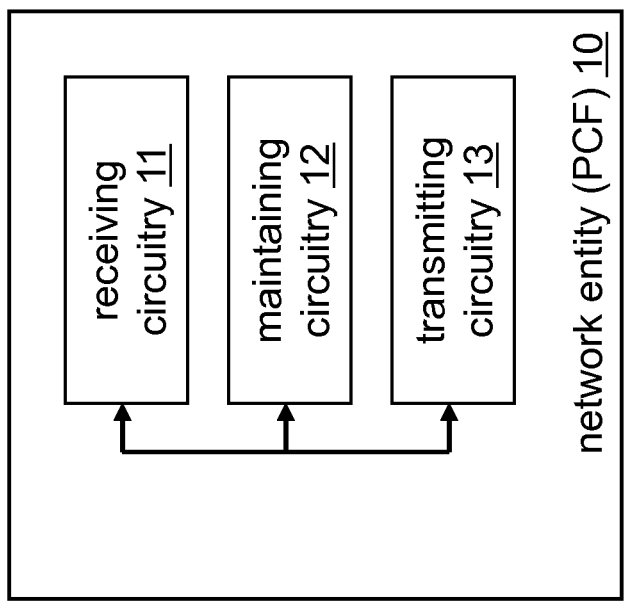
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) enforcement of maximum number of admitted terminals per network slice.

The basic concept of the present invention relies on policy control functions (PCF) enforcing the maximum number of UEs per network slice.

In particular, according to the basic concept of the present invention, one PCF or one PCF set is responsible for policy control of all the packet data unit (PDU) sessions established in a network slice (identified by single network slice selection assistance information (S-NSSAI)) subject to a capping number of UEs allowed to access the slice.

The following behavior according to the basic concept of the present invention is valid for those S-NSSAIs that require limitation of the number of subscribers per slice.

In particular, session management functions (SMF) are configured to use dynamic policy and charging control (PCC) for PDU sessions established in the network slice.

Further, the PCF or the PCF set can be configured with the maximum number of UEs allowed to access the network slice. Optionally, this information may be configured in PCF subscription data in a user data repository (UDR).

Further, the PCF or PCF set increments a counter of the current number of UEs that have been allowed to access the network slice, when a UE establishes its first PDU session in the network slice.

Still further, the PCF or PCF set decrements the counter of the current number of UEs that have been allowed to access the network slice, when a UE releases its last PDU session established in the network slice.

Furthermore, UEs registered in a network slice without a PDU session established in the network slice are not counted.

In the specific case of Home Routed scenarios, the home session management function (H-SMF) interacts with the home policy control function (H-PCF) and the latter enforces the maximum number of UEs in the home public land mobile network (H-PLMN) network slice.

Still further, when the maximum number of UEs allowed to access the S-NSSAI is reached, the PCF indicates that the S-NSSAI is not allowed for this reason to the SMF. The SMF indicates to the UE the S-NSSAI is rejected with a suitable cause code (indicating the rejection is due to upper limit of UEs per network slice reached) with an optional backoff timer so that the UE can try again to establish a PDU session to this S-NSSAI only after the backoff timer expires. The access management function (AMF) removes accordingly the S-NSSAI from the list of allowed NSSAI with an optional backoff timer, so that the UE can try again to register to this S-NSSAI only after the backoff timer expires.

Furthermore, the counter is incremented and decremented (according to the above principles) also when the UE is in evolved packet system (EPS) and establishes its first packet data network (PDN) connection to an access point name (APN) associated to the network slice (for which the corresponding S-NSSAI would be sent in the protocol configuration options (PCO) information element (IE) or extended protocol configuration options (ePCO) IE in EPS when the PDN connection is established in EPS). Besides, if the UE is rejected to establish a PDN connection due to the maximum number of UEs per slice being exceeded, the packet data network gateway (PGW)/SMF signals towards the UE the cause for the rejection and an optional backoff timer within the PCO or ePCO IE, so that, when the UE subsequently moves to the 5G system (5GS), the UE does not include in the requested NSSAIs any of the S-NSSAIs that were rejected.

A possible variant according to the basic concept of the present invention is that different thresholds are indicated in the SLA where for the first X subscribers a certain fee applies, and for other thresholds, other fees apply. According to this variant, no rejection of the UE is caused (due to exceedance of any threshold), but such exceedance has impacts on the charging.

Subsequently, exemplary embodiments of the present invention are described in generic terms.

Figure 5:
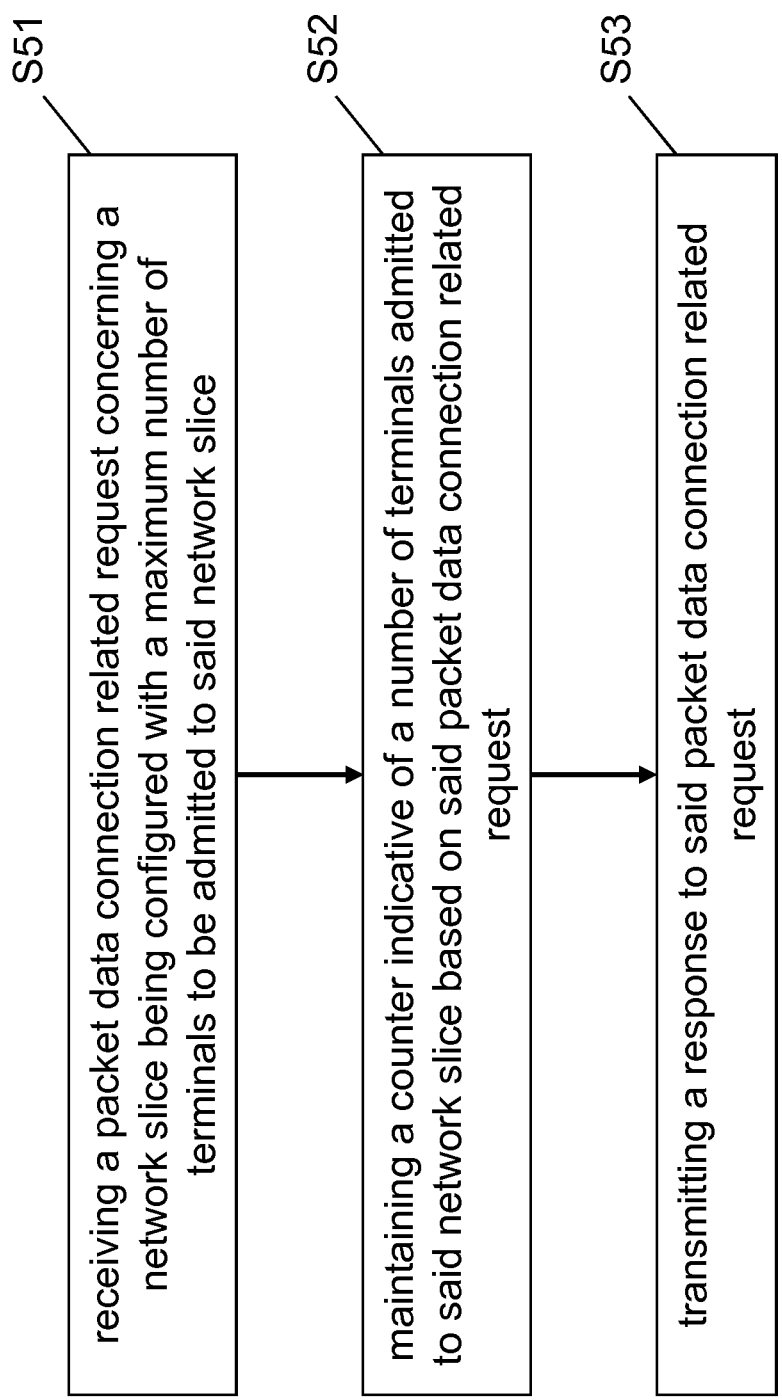
FIG. 5 is a schematic diagram of a procedure according to exemplary embodiments of the present invention.

FIG. 1 is a block diagram illustrating an apparatus according to exemplary embodiments of the present invention. The apparatus may be a network entity 10 such as a policy control function entity comprising receiving circuitry 11, maintaining circuitry 12, and transmitting circuitry 13. The receiving circuitry 11 receives a packet data connection related request concerning a network slice being configured with a maximum number of terminals to be admitted to said network slice. The maintaining circuitry 12 maintains a counter indicative of a number of terminals admitted to said network slice based on said packet data connection related request. The transmitting circuitry 13 transmits a response to said packet data connection related request. FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to exemplary embodiments of the present invention comprises an operation of receiving (S51) a packet data connection related request concerning a network slice being configured with a maximum number of terminals to be admitted to said network slice, an operation of maintaining (S52) a counter indicative of a number of terminals admitted to said network slice based on said packet data connection related request, and an operation of transmitting (S53) a response to said packet data connection related request.

Figure 2:
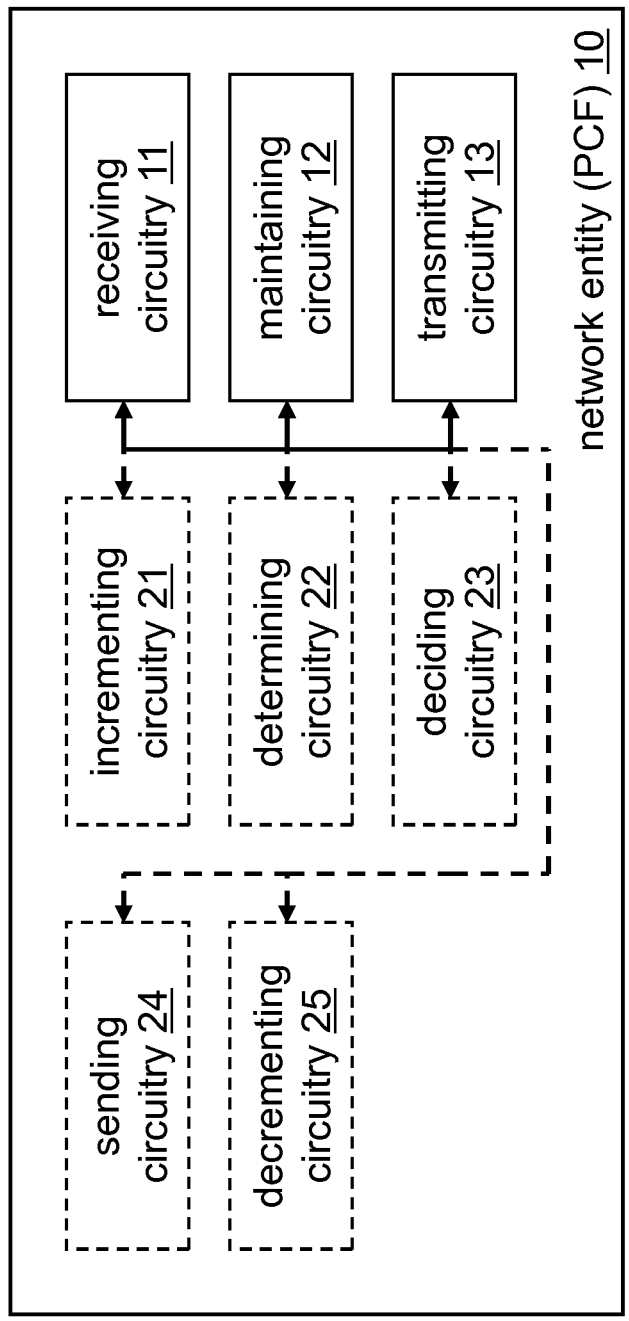
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise incrementing circuitry 21, determining circuitry 22, deciding circuitry 23, sending circuitry 24, and/or decrementing circuitry 25.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to exemplary embodiments of the present invention, said packet data connection related request is a session management policy association establishment request issued in response to a packet data unit session establishment request, wherein said session management policy association establishment request comprises at least single network slice selection assistance information identifying said network slice.

According to a variation of the procedure shown in FIG. 5, exemplary details of the maintaining operation (S52) are given, which are inherently independent from each other as such.

Such exemplary maintaining operation (S52) according to exemplary embodiments of the present invention may comprise an operation of incrementing said counter, if no packet data unit session exists, with respect to said network slice, for a communication endpoint issuing said packet data unit session establishment request.

According to further exemplary embodiments of the present invention, said packet data connection related request is a session management policy association establishment request issued in response to a packet data network connection establishment request, wherein said session management policy association establishment request comprises at least single network slice selection assistance information identifying said network slice.

According to a variation of the procedure shown in FIG. 5, exemplary details of the maintaining operation (S52) are given, which are inherently independent from each other as such.

Such exemplary maintaining operation (S52) according to exemplary embodiments of the present invention may comprise an operation of incrementing said counter, if no packet data unit session exists, with respect to said network slice, for a communication endpoint issuing said packet data network connection establishment request.

According to a variation of the procedure shown in FIG. 5, exemplary details of the transmitting operation (S53) are given, which are inherently independent from each other as such.

Such exemplary transmitting operation (S53) according to exemplary embodiments of the present invention may comprise an operation of determining whether said counter exceeds said maximum number of terminals to be admitted to said network slice, an operation of deciding to accept a session management policy association establishment according to said session management policy association establishment request, if said counter does not exceed said maximum number of terminals to be admitted to said network slice, and an operation of sending said response including a result of said deciding.

According to a variation of the procedure shown in FIG. 5, exemplary details of the transmitting operation (S53) are given, which are inherently independent from each other as such.

Such exemplary transmitting operation (S53) according to exemplary embodiments of the present invention may comprise an operation of determining whether said counter exceeds said maximum number of terminals to be admitted to said network slice, an operation of deciding to reject said session management policy association establishment according to said session management policy association establishment request, if said counter exceeds said maximum number of terminals to be admitted to said network slice, and an operation of sending said response including a result of said deciding.

According to further exemplary embodiments of the present invention, said response includes an indication that exceedance of said maximum number of terminals to be admitted to said network slice is a reason for rejection of said session management policy association establishment.

According to further exemplary embodiments of the present invention, said response includes information indicative of a retry inhibition period for said network slice.

According to further exemplary embodiments of the present invention, said response is a session management policy association establishment response.

According to further exemplary embodiments of the present invention, said packet data connection related request is a session management policy association termination request issued in response to a packet data unit session release request.

According to a variation of the procedure shown in FIG. 5, exemplary details of the maintaining operation (S52) are given, which are inherently independent from each other as such.

Such exemplary maintaining operation (S52) according to exemplary embodiments of the present invention may comprise an operation of decrementing said counter, if only one packet data unit session exists, with respect to said network slice, for a communication endpoint issuing said packet data unit session release request.

According to further exemplary embodiments of the present invention, said response is a session management association termination response.

Figure 3:
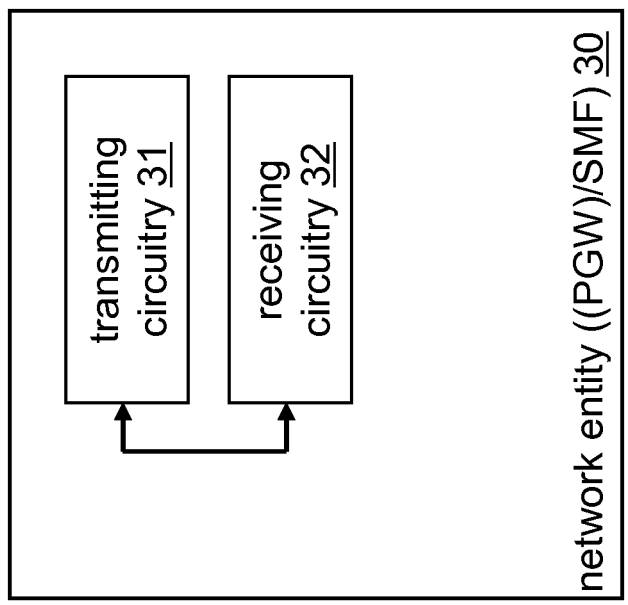
FIG. 3 is a block diagram illustrating an apparatus according to exemplary embodiments of the present invention.
Figure 6:
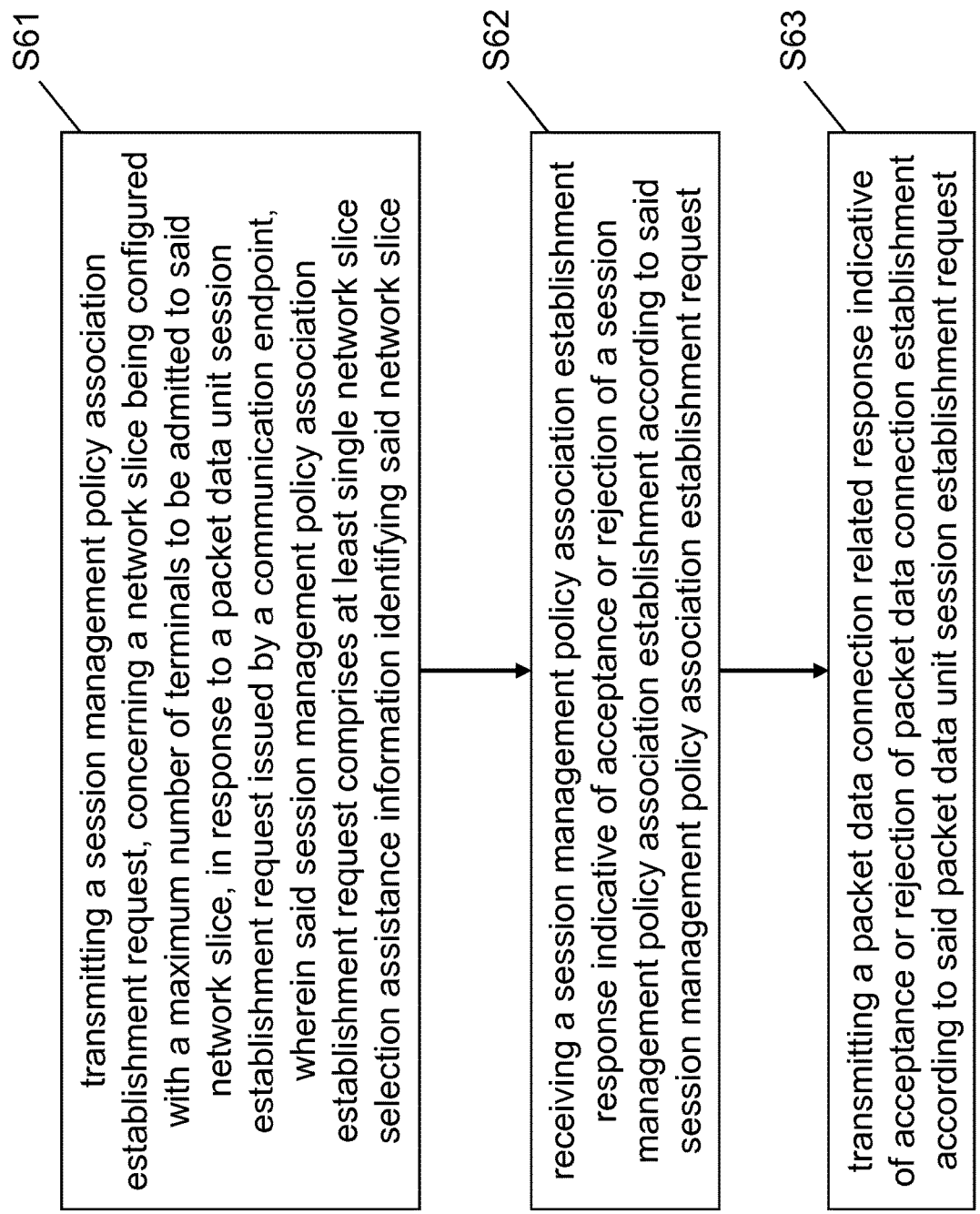
FIG. 6 is a schematic diagram of a procedure according to exemplary embodiments of the present invention.

FIG. 3 is a block diagram illustrating an apparatus according to exemplary embodiments of the present invention. The apparatus may be a network entity 30 such as a session management function entity or a packet data network gateway/session management function entity comprising transmitting circuitry 31 and receiving circuitry 32. The transmitting circuitry 31 transmits a session management policy association establishment request, concerning a network slice being configured with a maximum number of terminals to be admitted to said network slice, in response to a packet data unit session establishment request issued by a communication endpoint, wherein said session management policy association establishment request comprises at least single network slice selection assistance information identifying said network slice. The receiving circuitry 32 receives a session management policy association establishment response indicative of acceptance or rejection of a session management policy association establishment according to said session management policy association establishment request. The transmitting circuitry 31 (or an additional transmitting circuitry) transmits a packet data connection related response indicative of acceptance or rejection of packet data connection establishment according to said packet data unit session establishment request. FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to exemplary embodiments of the present invention comprises an operation of transmitting (S61) a session management policy association establishment request, concerning a network slice being configured with a maximum number of terminals to be admitted to said network slice, in response to a packet data unit session establishment request issued by a communication endpoint, wherein said session management policy association establishment request comprises at least single network slice selection assistance information identifying said network slice, an operation of receiving (S62) a session management policy association establishment response indicative of acceptance or rejection of a session management policy association establishment according to said session management policy association establishment request, and an operation of transmitting (S63) a packet data connection related response indicative of acceptance or rejection of packet data connection establishment according to said packet data unit session establishment request.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to further exemplary embodiments of the present invention, said session management policy association establishment response includes an indication that exceedance of said maximum number of terminals to be admitted to said network slice is a reason for rejection of said session management policy association establishment.

According to further exemplary embodiments of the present invention, said packet data connection related response includes said indication that exceedance of said maximum number of terminals to be admitted to said network slice is said reason for rejection of said session management policy association establishment.

According to further exemplary embodiments of the present invention, said session management policy association establishment response includes information indicative of a retry inhibition period for said network slice.

According to further exemplary embodiments of the present invention, said packet data connection related response includes information indicative of said retry inhibition period for said network slice.

According to further exemplary embodiments of the present invention, said packet data connection related response is a packet data unit session establishment response/rejection.

According to further exemplary embodiments of the present invention, alternatively, said packet data connection related response is a packet data network connections establishment response/rejection.

Figure 4:
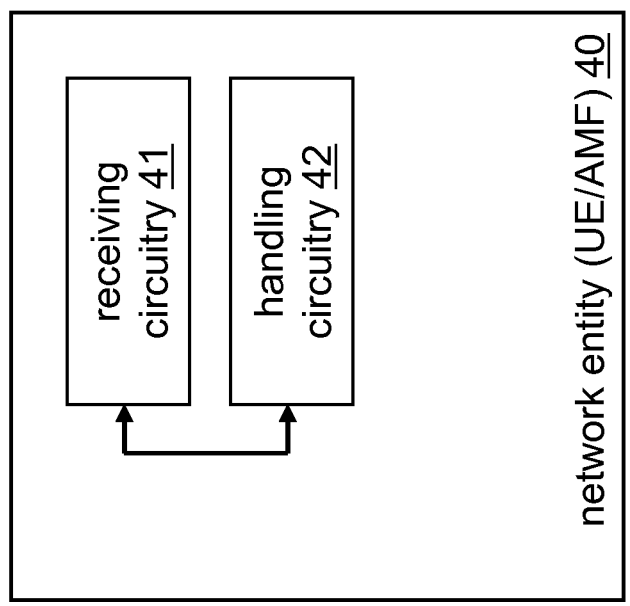
FIG. 4 is a block diagram illustrating an apparatus according to exemplary embodiments of the present invention.
Figure 7:
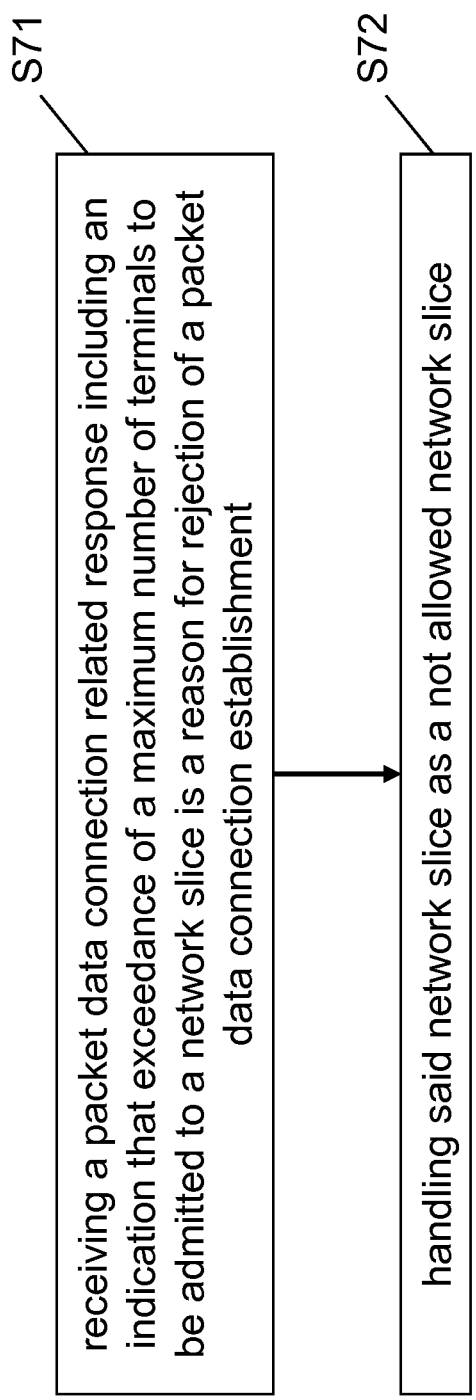
FIG. 7 is a schematic diagram of a procedure according to exemplary embodiments of the present invention.

FIG. 4 is a block diagram illustrating an apparatus according to exemplary embodiments of the present invention. The apparatus may be a network entity 40 such as a user equipment (terminal) or a user equipment/access and mobility management function entity comprising receiving circuitry 41 and handling circuitry 42. The receiving circuitry 41 receives a packet data connection related response including an indication that exceedance of a maximum number of terminals to be admitted to a network slice is a reason for rejection of a packet data connection establishment. The handling circuitry 42 handles said network slice as a not allowed network slice. FIG. 7 is a schematic diagram of a procedure according to exemplary embodiments of the present invention. The apparatus according to FIG. 4 may perform the method of FIG. 7 but is not limited to this method. The method of FIG. 7 may be performed by the apparatus of FIG. 4 but is not limited to being performed by this apparatus.

As shown in FIG. 7, a procedure according to exemplary embodiments of the present invention comprises an operation of receiving (S71) a packet data connection related response including an indication that exceedance of a maximum number of terminals to be admitted to a network slice is a reason for rejection of a packet data connection establishment, and an operation of handling (S72) said network slice as a not allowed network slice.

In an embodiment at least some of the functionalities of the apparatus shown in FIG. 4 may be shared between two physically separate devices forming one operational entity.

Therefore, the apparatus may be seen to depict the operational entity comprising one or more physically separate devices for executing at least some of the described processes.

According to a variation of the procedure shown in FIG. 7, exemplary details of the handling operation (S72) are given, which are inherently independent from each other as such.

Such exemplary handling operation (S72) according to exemplary embodiments of the present invention may comprise an operation of transmitting, in a 5G system user equipment configuration update message, an indication that said network slice is a not allowed network slice. This corresponds to behavior e.g. an AMF in a PDU session establishment scenario may show, see for example step 6 of FIG. 11.

Alternatively, such exemplary handling operation (S72) according to exemplary embodiments of the present invention may comprise an operation of preventing consideration of said network slice. This corresponds to behavior e.g. a UE in a PDN connection establishment in EPS scenario may show, as discussed below with reference to FIG. 13.

According to further exemplary embodiments of the present invention, said packet data connection related response includes information indicative of a retry inhibition period for said network slice.

According to further exemplary embodiments of the present invention, said packet data connection related response is a packet data unit session establishment rejection.

According to further exemplary embodiments of the present invention, alternatively, said packet data connection related response is a packet data network connections establishment rejection.

Figure 15:
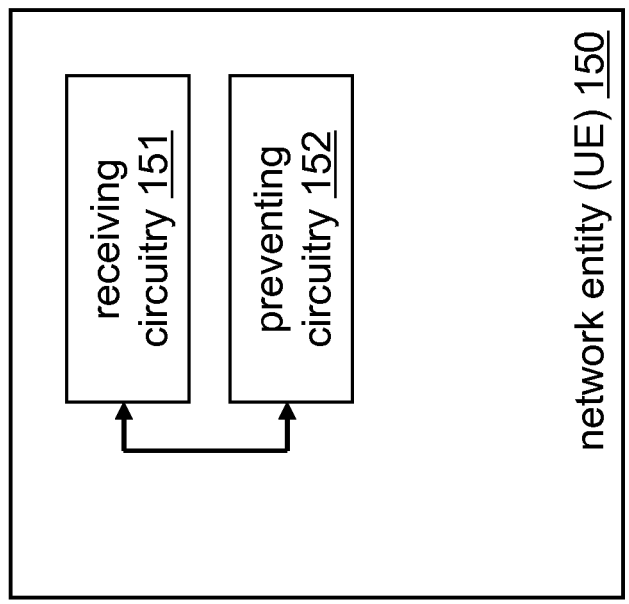
FIG. 15 is a block diagram illustrating an apparatus according to exemplary embodiments of the present invention.
Figure 16:
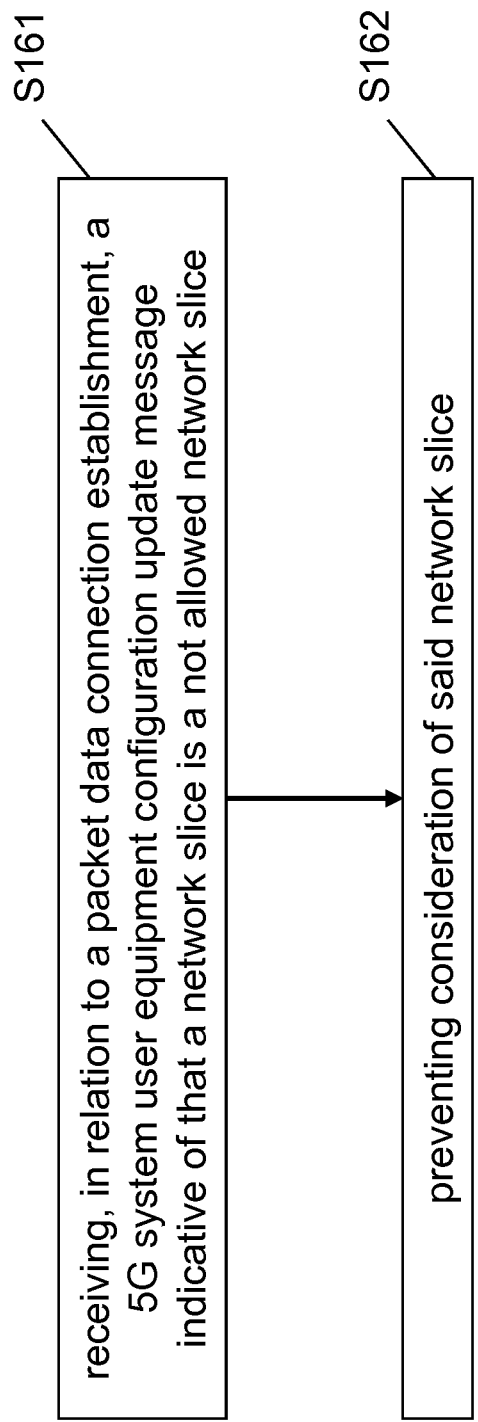
FIG. 16 is a schematic diagram of a procedure according to exemplary embodiments of the present invention.

FIG. 15 is a block diagram illustrating an apparatus according to exemplary embodiments of the present invention. The apparatus may be a network entity 150 such as a user equipment (terminal) or a user equipment comprising receiving circuitry 151 and preventing circuitry 152. The receiving circuitry 151 receives, in relation to a packet data connection establishment, a 5G system user equipment configuration update message indicative of that a network slice is a not allowed network slice. The preventing circuitry 152 prevents consideration of said network slice. FIG. 16 is a schematic diagram of a procedure according to exemplary embodiments of the present invention. The apparatus according to FIG. 15 may perform the method of FIG. 16 but is not limited to this method. The method of FIG. 16 may be performed by the apparatus of FIG. 15 but is not limited to being performed by this apparatus.

As shown in FIG. 16, a procedure according to exemplary embodiments of the present invention comprises an operation of receiving (S161), in relation to a packet data connection establishment, a 5G system user equipment configuration update message indicative of that a network slice is a not allowed network slice, and an operation of preventing (S162) consideration of said network slice.

In an embodiment at least some of the functionalities of the apparatus shown in FIG. 15 may be shared between two physically separate devices forming one operational entity. Therefore, the apparatus may be seen to depict the operational entity comprising one or more physically separate devices for executing at least some of the described processes.

Subsequently, exemplary embodiments of the present invention are described in more specific terms.

Figure 8:
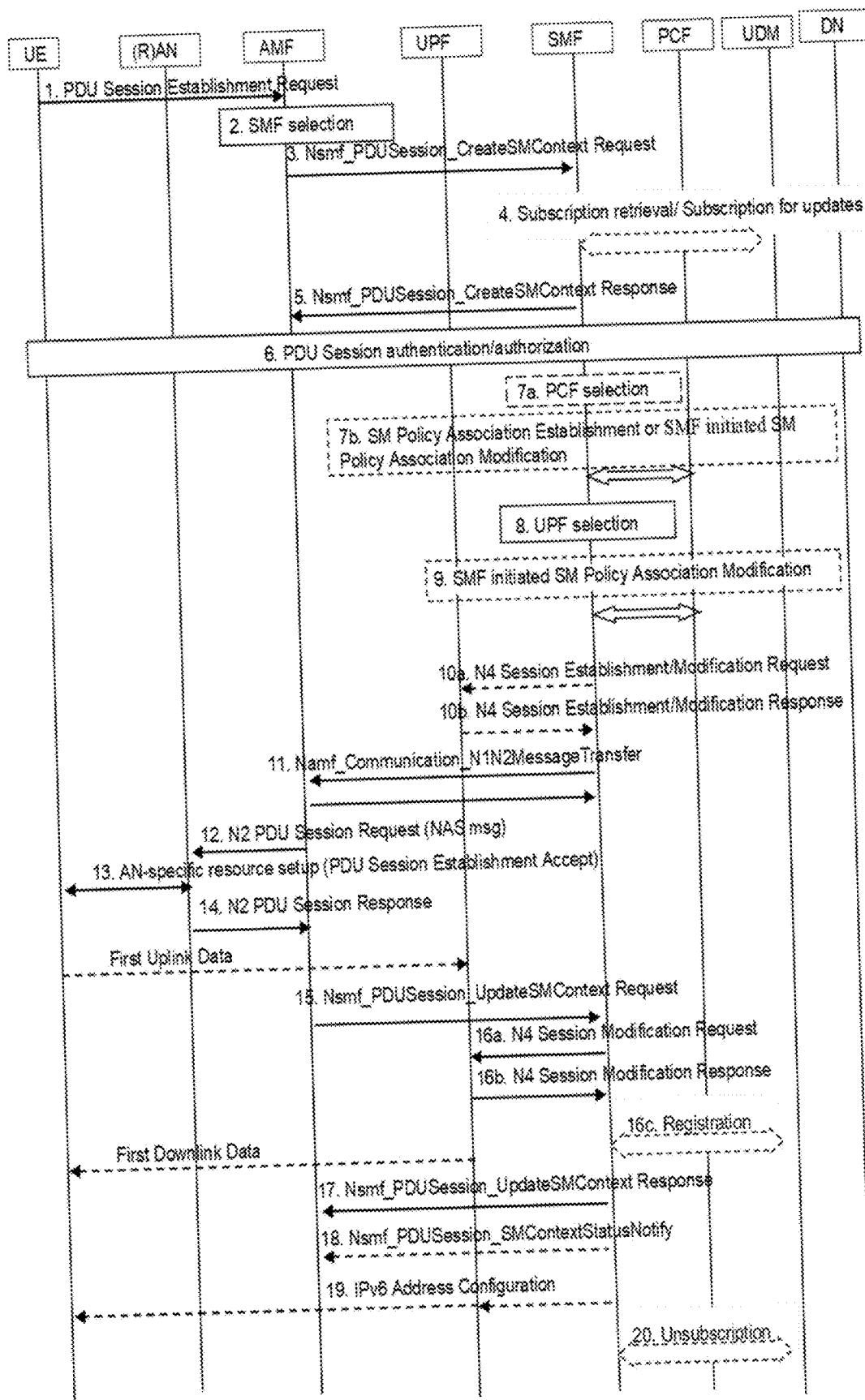
FIG. 8 shows a schematic diagram of signaling sequences.

FIG. 8 shows a schematic diagram of signaling sequences, and in particular depicts a call flow for a PDU session establishment in line with 3GPP technical specification (TS) 23.502, 4.3.2.2.1.

Here, with respect to step 7a. of FIG. 8 it is noted that, if dynamic PCC is to be used for the PDU session, the SMF performs PCF selection as described in 3GPP TS 23.501, clause 6.3.7.1. If the request type indicates "Existing PDU Session" or "Existing Emergency PDU Session", the SMF shall use the PCF already selected for the PDU session. Otherwise, the SMF may apply local policy.

Further, with respect to step 7b. of FIG. 8 it is noted that the SMF may perform a session management (SM) policy association establishment procedure as defined in clause 4.16.4 to establish an SM policy association with the PCF and get the default PCC rules for the PDU session. The generic public subscription identifier (GPSI) shall be included if available at the SMF. If the request type in step 3 of FIG. 8 indicates "Existing PDU Session", the SMF may provide information on the policy control request trigger condition(s) that have been met by an SMF initiated SM policy association modification procedure as defined in clause 4.16.5.1. The PCF may provide policy information defined in clause 5.2.5.4 and in TS 23.503 to the SMF. The PCF, based on the emergency data network name (DNN), sets the allocation and retention priority (ARP) of the PCC rules to a value that is reserved for emergency services as described in TS 23.503.

It is noted that the purpose of step 7 of FIG. 8 is to receive PCC rules before selecting a user plane function (UPF). If PCC rules are not needed as input for UPF selection, step 7 of FIG. 8 can be performed after step 8 of FIG. 8.

Figure 9:
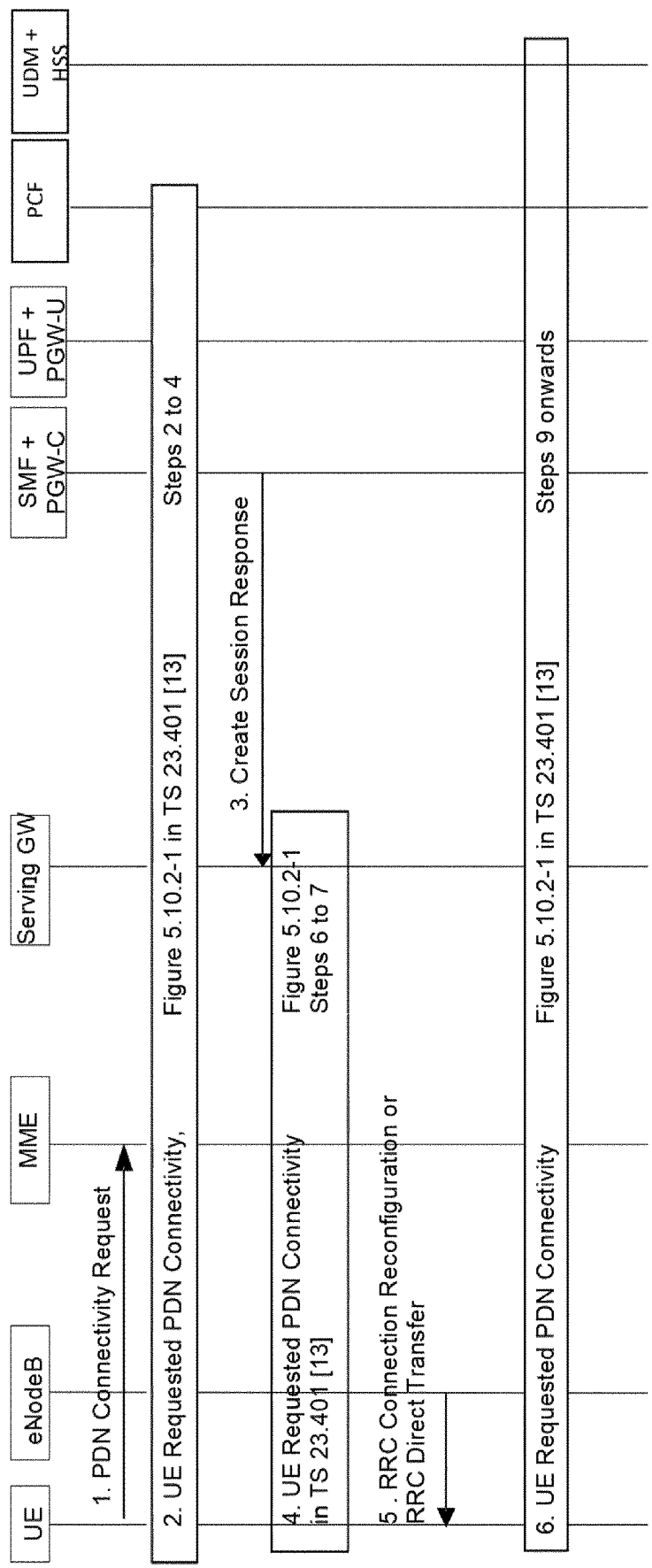
FIG. 9 shows a schematic diagram of signaling sequences.

FIG. 9 shows a schematic diagram of signaling sequences, and in particular illustrates impacts on a UE requested PDN connectivity procedure, and more particularly the call flow for a PDN connection establishment to a PGW/SMF via EPS (evolved Universal Mobile Telecommunications System Terrestrial Radio Access Network (E-UTRAN)) in line with 3GPP TS 23.502, 4.11.1.5.4.1.

Here, with respect to step 1 of FIG. 9, it is noted that the UE sends a PDN connectivity request to the mobility management entity (MME) as specified in step 1 in TS 23.401, clause 5.10.2, with the following modification:
  If the UE is 5G Non-Access-Stratum (NAS) capable and the request type is "initial request", the UE shall allocate a PDU Session ID and include it in the PCO. The PDU Session ID shall be unique across all other PDN connections of the UE.

Further, step 6 as specified in TS 23.401, clause 5.10.2, is executed with the following modification:
  If the PGW-C+SMF accepts to provide interworking of the PDN connection with 5GC, the PGW-C+SMF shall allocate 5G Quality of Service (QoS) parameters corresponding to a PDN connection, e.g. session aggregate maximum bit rate (AMBR), QoS rules and QoS flow level QoS parameters if needed for the QoS flow(s) associated with the QoS rule(s) and then include them in PCO.
  If the PGW-C+SMF accepts to provide interworking of the PDN connection with 5GC, the PGW-C+SMF shall determine the S-NSSAI associated with the PDN connection based on the operator policy, and send the S-NSSAI together with the PLMN ID to the UE in the PCO.

Further, the (relevant) steps of the procedure as specified in FIG. 9 are executed.

Further, step 8 as specified in TS 23.401, clause 5.10.2, is executed with the following modification:
- If 5G QoS parameters are included in the PCO, the UE shall store them. If 5G QoS parameters are not included in the PCO, the UE shall note that session continuity for this PDN connection on mobility to 5G is not provided by the network.
- If the S-NSSAI and the PLMN ID associated with the PDN connection are included in the PCO, the UE shall store them.

Further, the (relevant) steps of the procedure as specified in FIG. 9 are executed.

Figure 10:
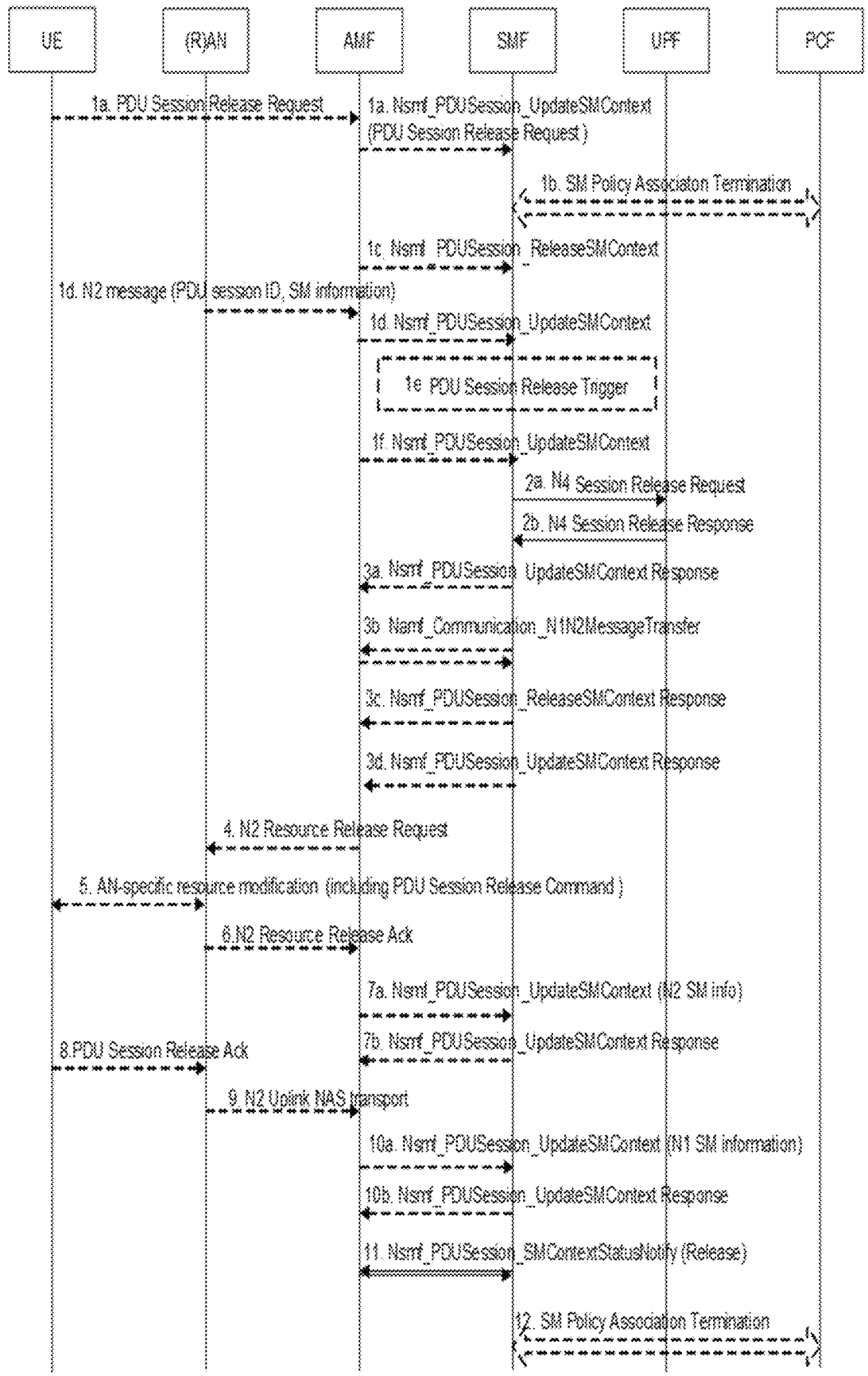
FIG. 10 shows a schematic diagram of signaling sequences.

FIG. 10 shows a schematic diagram of signaling sequences, and in particular illustrates UE or network requested PDU session release for non-roaming and roaming with local breakout, and more particularly depicts the call flow for a PDU session release in line with 3GPP TS 23.502, 4.3.4.2.

With respect to step 1b. of FIG. 10 (PDU session release initiated by the PCF) it is noted that the PCF may invoke an SM policy association termination procedure as defined in clause 4.16.6 to request the release of the PDU session.

Figure 11:
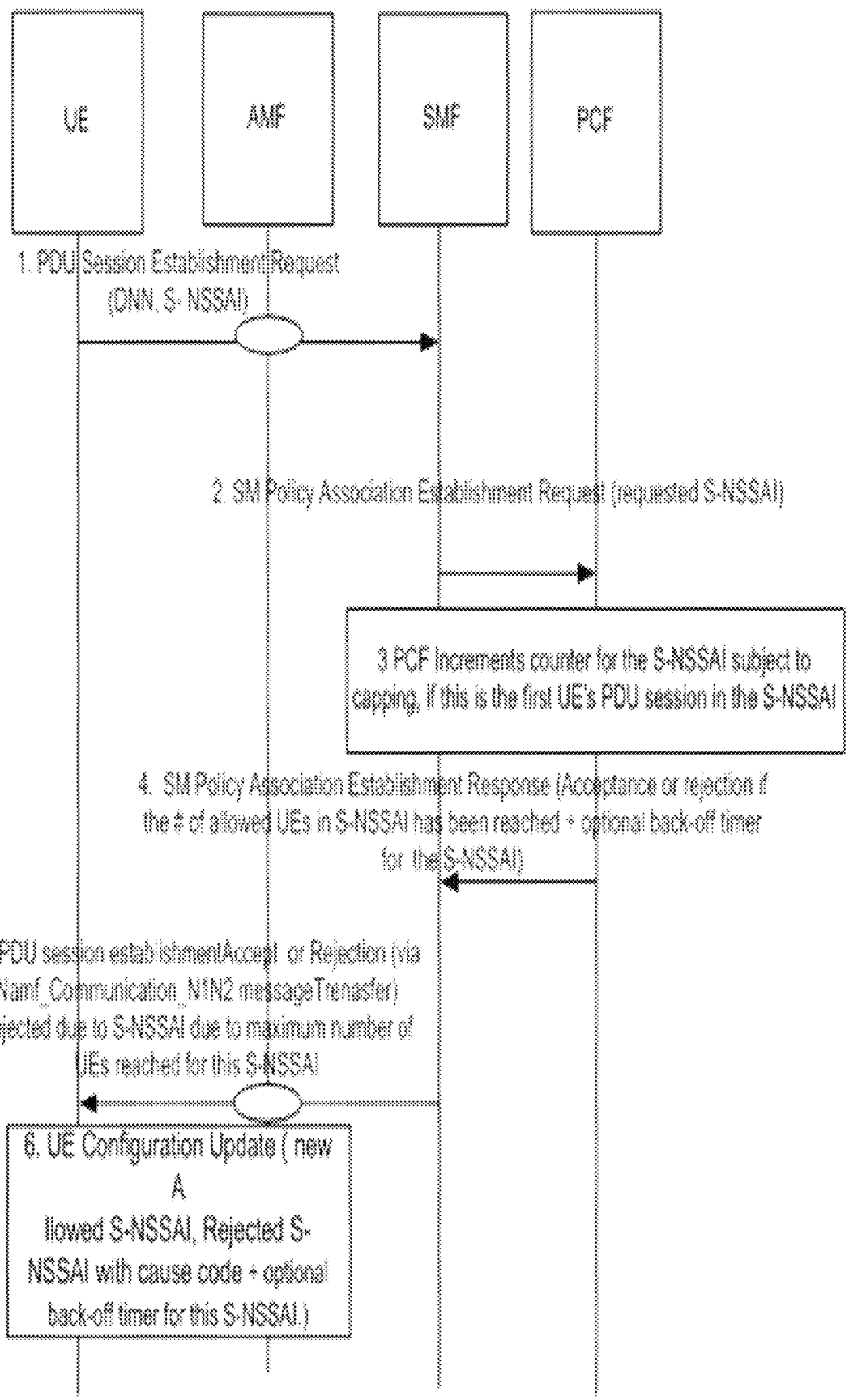
FIG. 11 shows a schematic diagram of an example of a system environment with signaling variants according to exemplary embodiments of the present invention.
Figure 12:
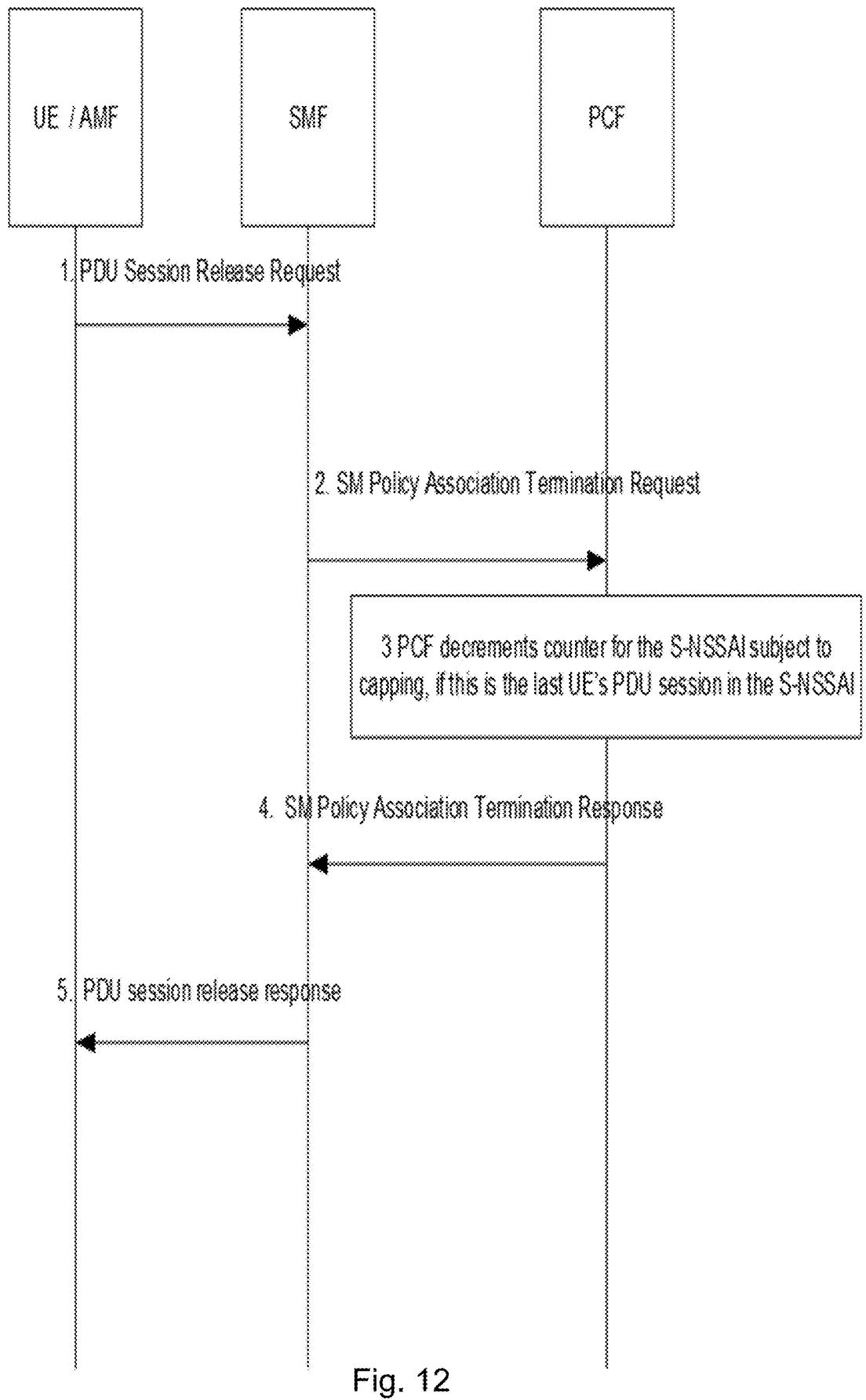
FIG. 12 shows a schematic diagram of an example of a system environment with signaling variants according to exemplary embodiments of the present invention.
Figure 13:
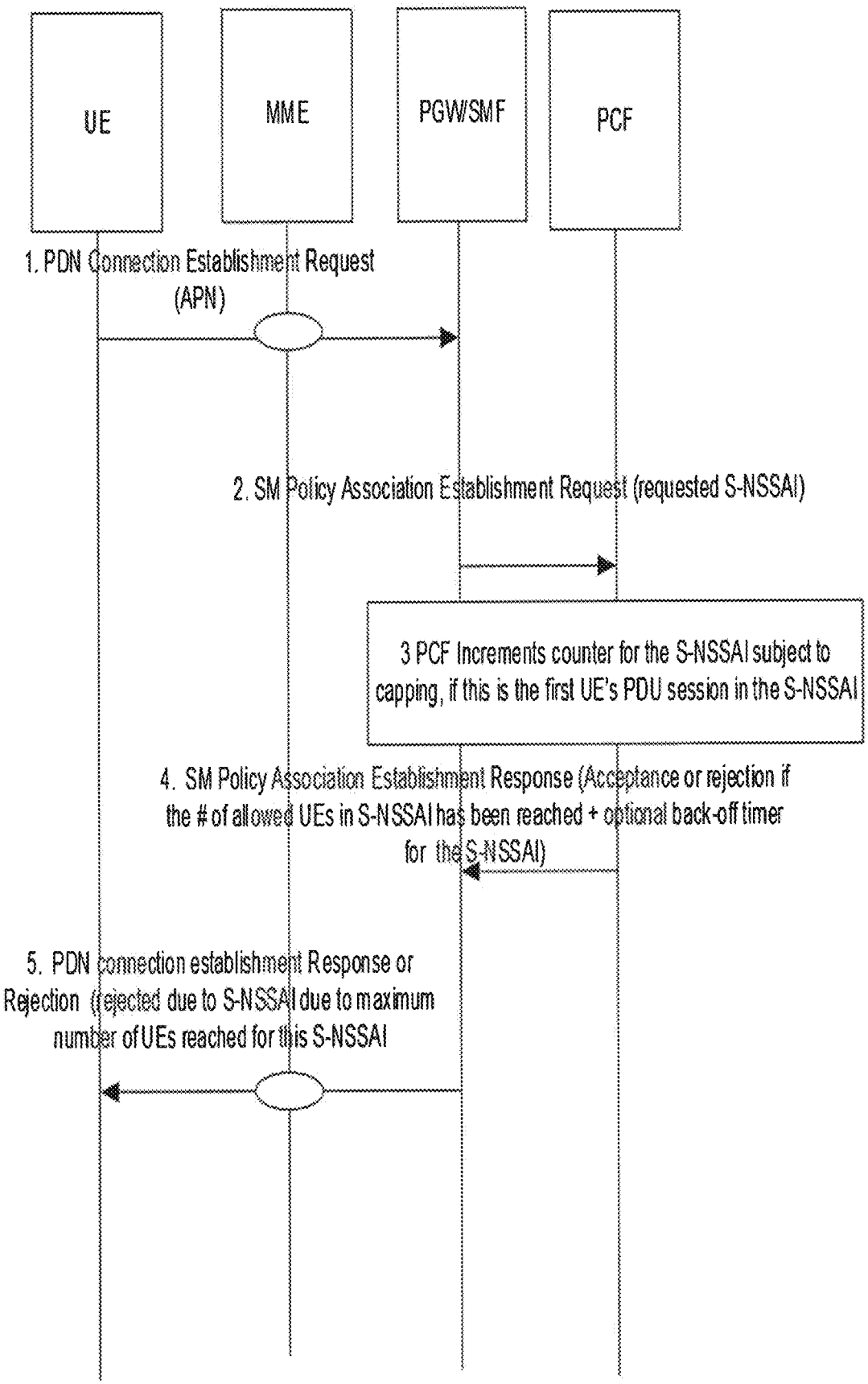
FIG. 13 shows a schematic diagram of an example of a system environment with signaling variants according to exemplary embodiments of the present invention.

FIGS. 11 to 13 illustrate the principles according to exemplary embodiments of the present invention in more specific terms.

Namely, FIG. 11 shows a schematic diagram of an example of a system environment with signaling variants according to exemplary embodiments of the present invention, and in particular illustrates a PDU session establishment with enforcement of a maximum number of UEs per network slice.

In step 1 of FIG. 11, the UE requests to establish a PDU session, where the SMF receives from the AMF the requested S-NSSAI.

Here, the SMF is configured to use dynamic PCC for PDU sessions requested to be established towards an S-NSSAI subject to a capping number of UEs allowed to access the network slice. The SMF discovers and selects a PCF able to serve the S-NSSAI (e.g. by issuing a discovery request to the network repository function (NRF) with a query parameter set to the S-NSSAI, 3GPP TS 29.510).

In step 2 of FIG. 11, the SMF requests to establish an SM policy association towards the selected PCF (subclause 4.16.4 of 3GPP TS 23.502).

In step 3 of FIG. 11, for a network slice subject to a capping number of UEs allowed to access the network slice, the PCF increments a counter of the current number of UEs that have been allowed to access the S-NSSAI, when a UE establishes its first PDU session in the S-NSSAI.

In step 4 of FIG. 11, the PCF establishes the policy association if the maximum number of UEs allowed to access the S-NSSAI is not exceeded.

Otherwise, the PCF indicates that the S-NSSAI is not allowed for this reason to the SMF and the PCF may also provide an optional backoff timer for that S-NSSAI.

In step 5 of FIG. 11, the SMF accepts or rejects the PDU session establishment respectively. In the latter case (rejection), the SMF indicates to the UE that the NSSAI is rejected with a suitable cause code (indicating the rejection is due to upper limit of UEs per slice reached).

In step 6 of FIG. 11, the AMF detects the failure of PDU session establishment with the cause code "upper limit of UEs per network slice is detected for the S-NSSAI" and updates the allowed S-NSSAI by removing this S-NSSAI and adds the rejected S-NSSAI with this S-NSSAI with an optional backoff timer so that the UE can try again to use this network slice only after the backoff timer expires as set by the PCF.

FIG. 12 shows a schematic diagram of an example of a system environment with signaling variants according to exemplary embodiments of the present invention, and in particular illustrates a PDU session release with enforcement of a maximum number of UEs per network slice.

In step 1 of FIG. 12, the UE or network (e.g. AMF) requests to release the UE's PDU session in the network slice.

In step 2 of FIG. 12, the SMF requests to terminate the SM policy association to the PCF (subclause 4.16.6 of 3GPP TS 23.502).

In step 3 of FIG. 12, for a network slice subject to a capping number of UEs allowed to access the network slice, the PCF decrements a counter of the current number of UEs that have been allowed to access the S-NSSAI, when a UE releases its last PDU session in the S-NSSAI.

In step 4 of FIG. 12, the PCF terminates the policy association.

In step 5 of FIG. 12, the SMF releases the PDU session.

The same principles discussed in relation to FIGS. 11 and 12 apply for home-routed (HR) PDU sessions, with the H-SMF interacting with the H-PCF for establishing or terminating the policy association for the PDU session to the requested network slice. A H-PCF capable to serve the requested S-NSSAI shall be selected.

FIG. 13 shows a schematic diagram of an example of a system environment with signaling variants according to exemplary embodiments of the present invention, and in particular illustrates a PDU connection establishment with enforcement of a maximum number of UEs per network slice.

In step 1 of FIG. 13, the UE requests to establish a PDN connection to an APN. The MME sends a GTP-C create session request to an SGW and PGW/SMF (see TS 29.274).

In step 2 of FIG. 13, the PGW/SMF derives the requested S-NSSAI as described in subclause 4.11.1.5.4.1 of TS 23.502.

Here, it is noted that the PGW/SMF is configured to use dynamic PCC for PDN connections requested to be established towards an S-NSSAI subject to a capping number of the number of UEs allowed to access the network slice. The PGW/SMF discovers and selects a PCF able to serve the S-NSSAI (e.g. by issuing a discovery request to the NRF with a query parameter set to the S-NSSAI, see 3GPP TS 29.510).

Further, in this step, the PGW/SMF requests to establish an SM policy association towards the selected PCF (see subclause 4.16.4 of 3GPP TS 23.502).

In step 3 of FIG. 13, for a network slice subject to a capping number of UEs allowed to access the network slice, the PCF increments a counter of the current number of UEs that have been allowed to access the S-NSSAI, when a UE establishes its first PDU session in the S-NSSAI.

Here, it is noted that the PCF may also enforce the maximum number of PDU sessions allowed per slice by incrementing or decrementing a corresponding counter whenever a PDN connection is established or released in EPS.

In step 4 of FIG. 13, the PCF establishes the policy association if the maximum number of UEs allowed to access the S-NSSAI is not exceeded. Otherwise, the PCF indicates that the S-NSSAI is not allowed for this reason to the SMF and the PCF may also provide an optional backoff timer for that S-NSSAI.

In step 5 of FIG. 13, the PGW/SMF accepts or rejects the PDU session establishment respectively. In the latter case (rejection), the PGW/SMF indicates to the UE that the NSSAI is rejected with a suitable cause code (indicating the rejection is due to upper limit of UEs per network slice reached) and with an optional backoff timer so the UE can try again to use this network slice only after the backoff timer expires as set by the PCF. This may be implemented e.g. by the PGW/SMF including the S-NSSAI, a new rejection cause and a new optional backoff timer in PCO IE (see subclause 10.5.6.3 of 3GPP TS 24.008) or ePCO IE it sends to the UE.

Upon receipt of the above indication (as a consequence of the above indication), the UE does not include in the requested NSSAI any of the S-NSSAI that were rejected, when the UE subsequently moves to 5GS.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 14:
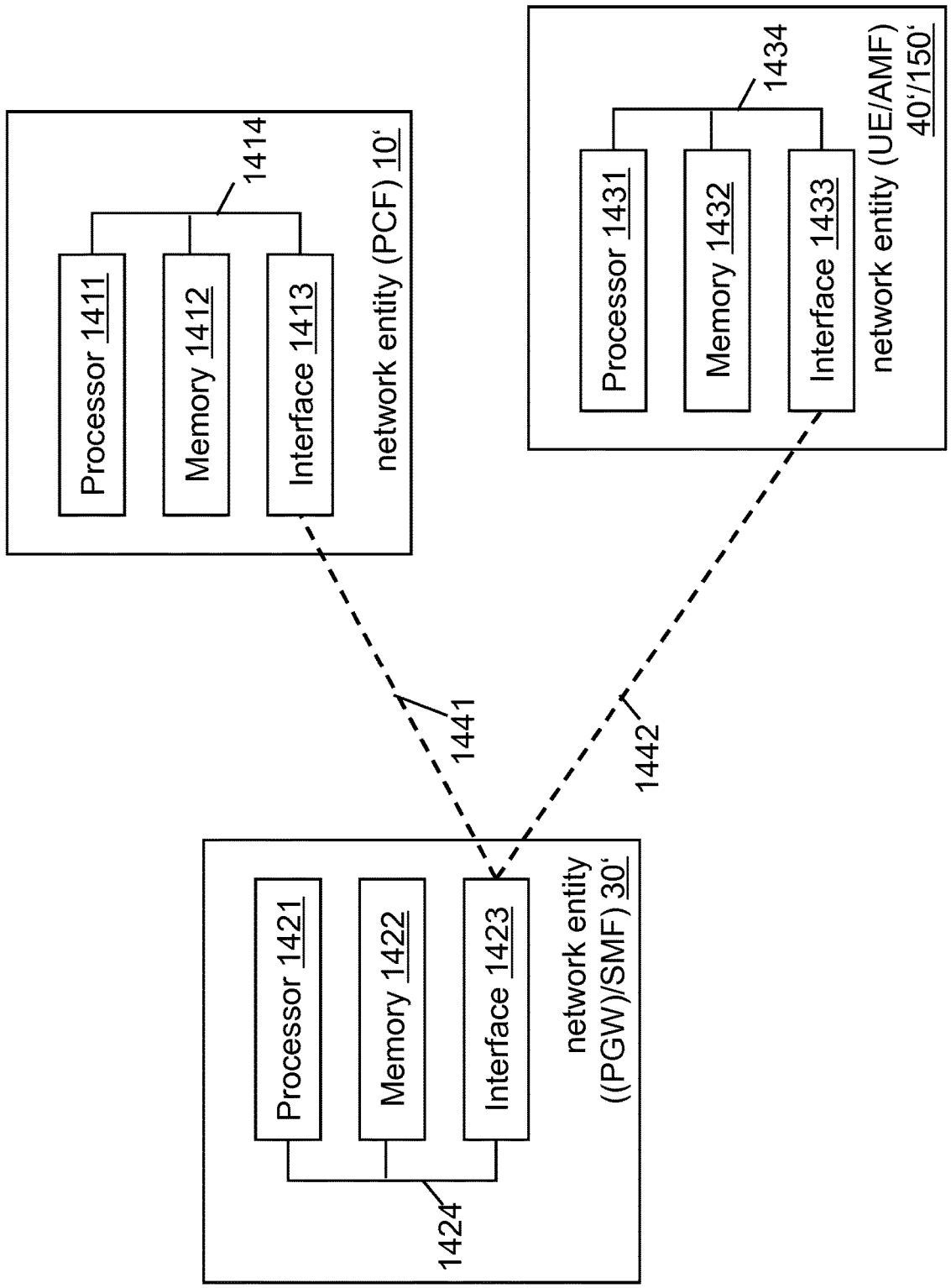
FIG. 14 is a block diagram alternatively illustrating apparatuses according to exemplary embodiments of the present invention.

In FIG. 14, an alternative illustration of apparatuses according to exemplary embodiments of the present invention is depicted. As indicated in FIG. 14, according to exemplary embodiments of the present invention, the apparatus (network entity) 10' (corresponding to the network entity 10) comprises a processor 1411, a memory 1412 and an interface 1413, which are connected by a bus 1414 or the like. Further, according to exemplary embodiments of the present invention, the apparatus (network entity) 30' (corresponding to the network entity 30) comprises a processor 1421, a memory 1422 and an interface 1423, which are connected by a bus 1424 or the like. Further, according to exemplary embodiments of the present invention, the apparatus (network entity) 40'/150' (corresponding to the network entity 40/150) comprises a processor 1431, a memory 1432 and an interface 1433, which are connected by a bus 1434 or the like. The apparatuses may be connected via links 1441, 1442, respectively.

The processor 1411/1421/1431 and/or the interface 1413/1423/1433 may also include a modem or the like to facilitate communication over a (hardwire or wireless) link, respectively. The interface 1413/1423/1433 may include a suitable transceiver coupled to one or more antennas or communication means for (hardwire or wireless) communications with the linked or connected device(s), respectively. The interface 1413/1423/1433 is generally configured to communicate with at least one other apparatus, i.e. the interface thereof.

The memory 1412/1422/1432 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network entity 10 comprises at least one processor 1411, at least one memory 1412 including computer program code, and at least one interface 1413 configured for communication with at least another apparatus.

The processor (i.e. the at least one processor 1411, with the at least one memory 1412 and the computer program code) is configured to perform receiving a packet data connection related request concerning a network slice being configured with a maximum number of terminals to be admitted to said network slice (thus the apparatus comprising corresponding means for receiving), to perform maintaining a counter indicative of a number of terminals admitted to said network slice based on said packet data connection related request (thus the apparatus comprising corresponding means for maintaining), and to perform transmitting a response to said packet data connection related request (thus the apparatus comprising corresponding means for transmitting).

According to further exemplary embodiments of the present invention, an apparatus representing the network entity 30 comprises at least one processor 1421, at least one memory 1422 including computer program code, and at least one interface 1423 configured for communication with at least another apparatus. The processor (i.e. the at least one processor 1421, with the at least one memory 1422 and the computer program code) is configured to perform transmitting a session management policy association establishment request, concerning a network slice being configured with a maximum number of terminals to be admitted to said network slice, in response to a packet data unit session establishment request issued by a communication endpoint, wherein said session management policy association establishment request comprises at least single network slice selection assistance information identifying said network slice (thus the apparatus comprising corresponding means for transmitting), to perform receiving a session management policy association establishment response indicative of acceptance or rejection of a session management policy association establishment according to said session management policy association establishment request (thus the apparatus comprising corresponding means for receiving), and to perform transmitting a packet data connection related response indicative of acceptance or rejection of packet data connection establishment according to said packet data unit session establishment request.

According to still further exemplary embodiments of the present invention, an apparatus representing the network entity 40 comprises at least one processor 1431, at least one memory 1432 including computer program code, and at least one interface 1433 configured for communication with at least another apparatus. The processor (i.e. the at least one processor 1431, with the at least one memory 1432 and the computer program code) is configured to perform receiving a packet data connection related response including an indication that exceedance of a maximum number of terminals to be admitted to a network slice is a reason for rejection of a packet data connection (thus the apparatus comprising corresponding means for receiving), and to perform handling said network slice as a not allowed network slice (thus the apparatus comprising corresponding means for handling).

According to still further exemplary embodiments of the present invention, an apparatus representing the network entity 150 comprises at least one processor 1431, at least one memory 1432 including computer program code, and at least one interface 1433 configured for communication with at least another apparatus. The processor (i.e. the at least one processor 1431, with the at least one memory 1432 and the computer program code) is configured to perform receiving, in relation to a packet data connection establishment, a 5G system user equipment configuration update message indicative of that a network slice is a not allowed network slice (thus the apparatus comprising corresponding means for receiving), and to perform preventing consideration of said network slice (thus the apparatus comprising corresponding means for preventing).

For further details regarding the operability/functionality of the individual apparatuses, reference is made to the above description in connection with any one of FIGS. 1 to 13, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enforcement of maximum number of admitted terminals per network slice. Such measures exemplarily comprise receiving a packet data connection related request concerning a network slice being configured with a maximum number of terminals to be admitted to said network slice, maintaining a counter indicative of a number of terminals admitted to said network slice based on said packet data connection related request, and transmitting a response to said packet data connection related request.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
5GS 5G system
AMBR aggregate maximum bit rate
AMF access management function
APN access point name
ARP allocation and retention priority
DNN data network name
ePCO extended protocol configuration options
EPS evolved packet system
E-UTRAN evolved Universal Mobile Telecommunications System Terrestrial Radio Access Network
GPSI generic public subscription identifier
GSMA Global System for Mobile Communications Association
GST generic slice template
HR home-routed
H-PCF home policy control function
H-PLMN home public land mobile network
H-SMF home session management function
IE information element
MME mobility management entity
NAS Non-Access-Stratum
NRF network repository function
PCC policy and charging control
PCF policy control function
PCO protocol configuration option
PDN packet data network
PDU packet data unit
PGW packet data network gateway
QoS Quality of Service
SLA service level agreement
SM session management
SMF session management functions
S-NSSAI single network slice selection assistance information
TS technical specification
UDR user data repository
UE user equipment
UPF user plane function

The invention claimed is:

1. A method comprising:
receiving a packet data connection related request concerning a network slice being configured with a maximum number of terminals to be admitted to said network slice,
maintaining a counter indicative of a number of terminals admitted to said network slice based on said packet data connection related request, and
transmitting a response to said packet data connection related request;
said packet data connection related request is a session management policy association establishment request issued in response to a packet data unit session establishment request, wherein said session management policy association establishment request comprises at least single network slice selection assistance information identifying said network slice,
in relation to said maintaining, the method further comprises;
incrementing said counter, if no packet data unit session exists, with respect to said network slice, for a communication endpoint issuing said packet data unit session establishment request.

2. A method comprising:
receiving a packet data connection related request concerning a network slice being configured with a maximum number of terminals to be admitted to said network slice,
maintaining a counter indicative of a number of terminals admitted to said network slice based on said packet data connection related request, and
transmitting a response to said packet data connection related request;
said packet data connection related request is a session management policy association establishment request issued in response to a packet data network connection establishment request, wherein said session management policy association establishment request comprises at least single network slice selection assistance information identifying said network slice,
in relation to said maintaining, the method further comprises:
incrementing said counter, if no packet data unit session exists, with respect to said network slice, for a communication endpoint issuing said packet data network connection establishment request.

3. A method comprising:
receiving a packet data connection related request concerning a network slice being configured with a maximum number of terminals to be admitted to said network slice,
maintaining a counter indicative of a number of terminals admitted to said network slice based on said packet data connection related request, and
transmitting a response to said packet data connection related request;
said packet data connection related request is a session management policy association establishment request issued in response to a packet data network connection establishment request, wherein said session management policy association establishment request comprises at least single network slice selection assistance information identifying said network slice,
in relation to transmitting a response, the method further comprises:
determining whether said counter exceeds said maximum number of terminals to be admitted to said network slice,
deciding to accept a session management policy association establishment request according to said session management policy association establishment request, if said counter does not exceed said maximum number of terminals to be admitted to said network slice, and
sending said response including a result of deciding to accept said session management association establishment request.

4. A method comprising:
- receiving a packet data connection related request concerning a network slice being configured with a maximum number of terminals to be admitted to said network slice,
- maintaining a counter indicative of a number of terminals admitted to said network slice based on said packet data connection related request, and
- transmitting a response to said packet data connection related request;
- said packet data connection related request is a session management policy association establishment request issued in response to a packet data network connection establishment request, wherein said session management policy association establishment request comprises at least single network slice selection assistance information identifying said network slice,
- in relation to transmitting a response, the method further comprises:
  - determining whether said counter exceeds said maximum number of terminals to be admitted to said network slice,
  - deciding to reject said session management policy association establishment request according to said session management policy association establishment request, if said counter exceeds said maximum number of terminals to be admitted to said network slice, and
  - sending said response including a result of deciding to reject said session management association establishment request.

\* \* \* \* \*